(12) United States Patent
Imai et al.

(10) Patent No.: US 8,005,887 B2
(45) Date of Patent: Aug. 23, 2011

(54) GATEWAY APPARATUS AND SYSTEM

(75) Inventors: Mitsuhiro Imai, Yokohama (JP);
Masataka Okayama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 764 days.

(21) Appl. No.: 11/775,426

(22) Filed: Jul. 10, 2007

(65) Prior Publication Data
US 2008/0008199 A1    Jan. 10, 2008

(30) Foreign Application Priority Data
Jul. 10, 2006    (JP) .................................. 2006-188785

(51) Int. Cl.
*G06F 15/16* (2006.01)
(52) U.S. Cl. ......... 709/200; 709/220; 709/221; 709/223
(58) Field of Classification Search .......... 709/200–203, 709/217–227, 228–230
See application file for complete search history.

(56) References Cited

U.S. PATENT DOCUMENTS

| | | | |
|---|---|---|---|
| 6,526,581 B1 * | 2/2003 | Edson .............................. | 725/74 |
| 6,941,135 B2 * | 9/2005 | Minear et al. .................. | 455/419 |
| 7,260,597 B1 * | 8/2007 | Hofrichter et al. ............ | 709/200 |
| 2003/0033373 A1 | 2/2003 | Szucs et al. | |
| 2004/0139177 A1 | 7/2004 | Yook | |
| 2004/0158829 A1 * | 8/2004 | Beresin et al. ................ | 717/178 |
| 2004/0205766 A1 * | 10/2004 | Lee et al. ....................... | 719/311 |
| 2005/0198185 A1 | 9/2005 | Yamaoka et al. | |
| 2007/0192477 A1 * | 8/2007 | Hicks et al. .................... | 709/223 |
| 2008/0255692 A1 * | 10/2008 | Hofrichter et al. ............. | 700/94 |

FOREIGN PATENT DOCUMENTS

| | | |
|---|---|---|
| EP | 0 971 509 A1 | 1/2000 |
| JP | 2002-520901 | 7/2002 |
| JP | 2002-323989 | 11/2002 |
| JP | 2003-233586 | 8/2003 |
| JP | 2004-213612 | 7/2004 |
| JP | 2005-267619 | 9/2005 |
| JP | 2005-339401 | 12/2005 |

* cited by examiner

*Primary Examiner* — Moustafa M Meky
(74) *Attorney, Agent, or Firm* — Antonelli, Terry, Stout & Kraus, LLP.

(57) ABSTRACT

For achieving smooth facilities of services within a home network system where service applications of a plural number of service undertakes are mixed with, management is made upon a use memory volume for an application and an accessing authority to equipments within a home by means of a home gateway, and thereby achieving a home network for preventing an unexpected application from communicating with an unexpected equipment within a home, but without obstructing mutual services by the plural number of service undertakers, with setting up an upper limit of memory volume when starting up the application and the accessing authority from the application to the equipment within the home.

9 Claims, 10 Drawing Sheets

SERVICE UNDERTAKER USE MEMORY INFORMATION TABLE 1000

| SERVICE UNDERTAKER ID 1001 | USE MEMORY VOLUME 1002 |
|---|---|
| SP002 | 10MB |
| SP003 | 3MB |

FIG.6

SERVICE AP USE EQUIPMENT INFORMATION TABLE 1100

| SERVICE AP ID 1101 | USE EQUIPMENT ID 1102 |
|---|---|
| AP01 | D1, D2, D3 |
| AP02 | D1, D3 |
| AP03 | D3 |

FIG.7

EQUIPMENT INFORMATION TABLE 1200

| EQUIPMENT ID 1201 | EQUIPMENT NAME 1202 | IP ADDRESS 1203 |
|---|---|---|
| D1 | EQUIPMENT 70 | 198.168.0.2 |
| D2 | EQUIPMENT 80 | 198.168.0.3 |
| D3 | EQUIPMENT 90 | 198.168.0.4 |

FIG.9

SERVICE AP INFORMATION TB 1300

| SERVICE AP ID 1301 | SERVICE AP NAME 1302 |
|---|---|
| AP01 | AP64 |
| AP02 | AP65 |
| AP03 | AP66 |

FIG.10

SERVICE UNDERTAKER INFORMATION TB 1400

| SERVICE AP ID 1401 | SERVICE UNDERTAKER ID 1402 |
|---|---|
| AP01 | SP003 |
| AP02 | SP003 |
| AP03 | SP002 |

GATEWAY APPARATUS AND SYSTEM

The present application claims priority of Japanese application JP 2006-188785 filed on Jul. 10, 2006, the contents of which is hereby incorporated by reference into this application.

BACKGROUND OF THE INVENTION

The present invention relates to a gateway apparatus and a system, and it relates, in particular, to a gateway apparatus and a system, enabling to execute a service application among a plural number of service undertakers with safety.

Conventionally, a home network system for controlling equipments or apparatuses, which are connected with a home network, is connected through the home network, and thereby proposing or achieving one, which controls mutually between two (2) or more of the equipments or apparatuses installing a standard protocol, such as, UPnP or ECHONET, for example.

However, with such the conventional home network system, there are following problems; i.e., communication cannot be made between the equipments or apparatus, one being operable with the protocol different from that of the other, and also that it is difficult to extend the functions to others, which are owned by the application installed in the equipment in advance, if it is desired after introduction of the system.

For this reason, in recent years is proposed a means for enabling to extend the functions of home appliances under an environment of the home network, by conducting installation and management of an application into the equipment to be controlled at home, through a framework for assisting an integration of home network middleware, such as, HAVi, UPnP, Jini, HWW, etc., for example, but without being controlled by the home network middleware (for example, Patent Document 1).

The home network system in the Patent Document 1 introduces an application server, which installs OSGi framework for integrally assisting the various kinds of home network middleware, so as to provide a middleware service for accessing various kinds of devices, as a bundling function, and thereby achieving a home network system without being restricted with such the middleware.

[Patent Document 1] Japanese Patent Laying-Open No. 2004-213612 (FIG. 3)

SUMMARY OF THE INVENTION

With the method shown in the Patent Document 1, since there is taken no consideration about the restriction, in particular, for the application to access to the equipment to be controlled, there is a possibility that a specific application controls an equipment to be controlled, unexpectedly; therefore, it is still insufficient in the usability thereof for a user.

Also, with the method shown in the Patent Document 1, no consideration is paid on management of resources, such as, a memory, etc., on the application server; i.e., there is a possibility that, in particular, in case where applications of a plural number of undertakers are executed at the same time, for example, an application(s) of other service undertaker(s) cannot start even if trying to start, later, because of consumption of the memory too much by the other applications of the service undertakes, which are already started in advance, and therefore, it is insufficient in the usability thereof for the user.

Then, an aspect according to the present invention is to provide a gateway apparatus and a system, being improved in the usability thereof.

For example, a home gateway apparatus comprises: a control means for controlling equipments, which are connected with said home network; and a download means for downloading an application from said home network, wherein said control means makes such control that the application downloaded by said download means controls a predetermined one of said equipments.

Also, said control means controls said equipment upon basis of information relating to use memory for said application.

With this, it is possible to provide a gateway apparatus or a system, which is improved in the operability for a user, for example.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 6 is an example for showing an equipment information table for use of a service AP;

FIG. 7 is an example for showing the equipment information table;

FIG. 9 is an example for showing a service AP information table;

FIG. 10 is an example for showing a service undertaker information table;

DETAILED DESCRIPTION OF THE INVENTION

Hereinafter, embodiments according to the present invention will be fully explained by referring to the attached drawings.

Figure 1:
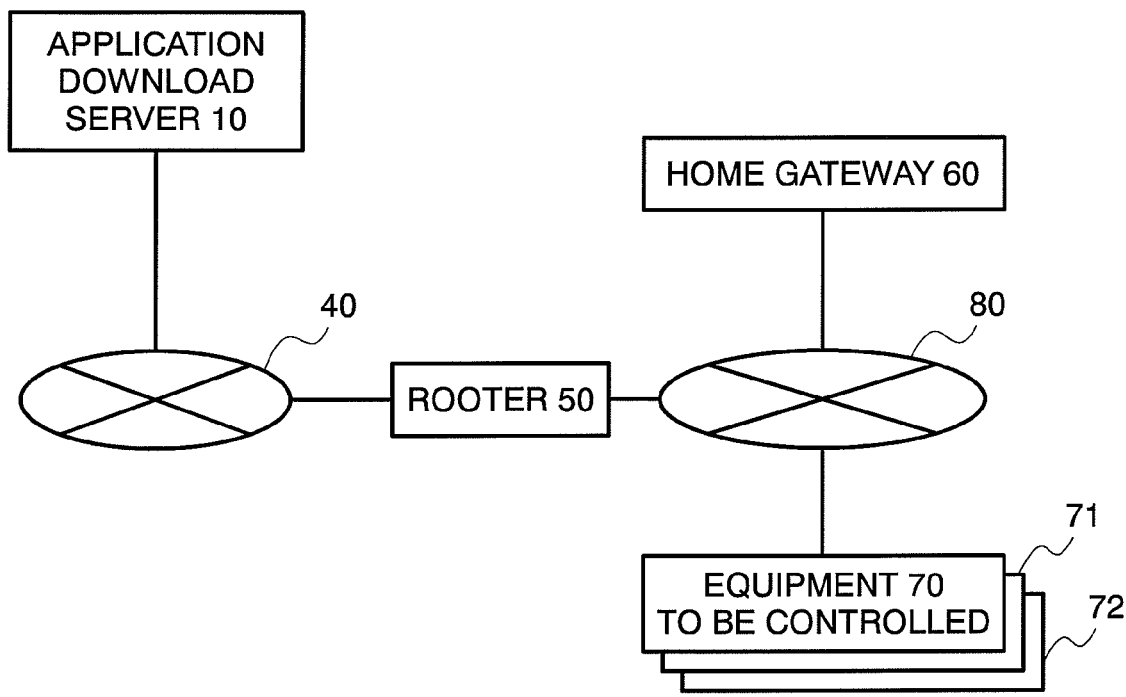
FIG. 1 is an example for showing a network construction, according to an embodiment of the present invention.
Figure 2:
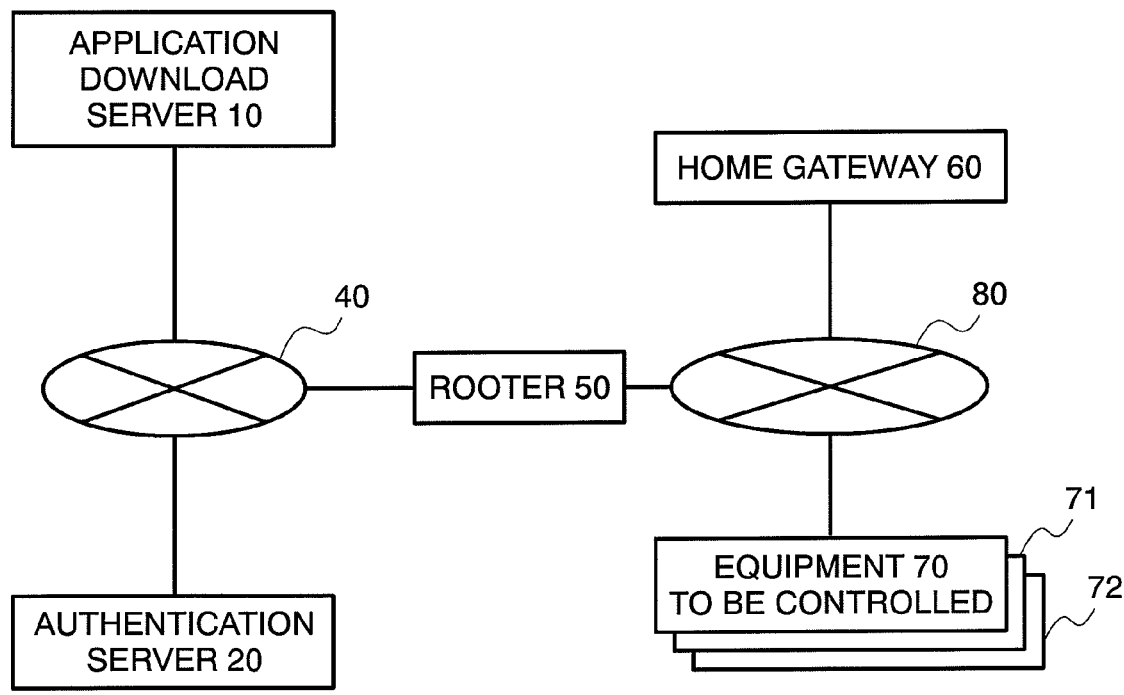
FIG. 2 is an example for showing a network construction, according to another embodiment of the present invention.
Figure 3:
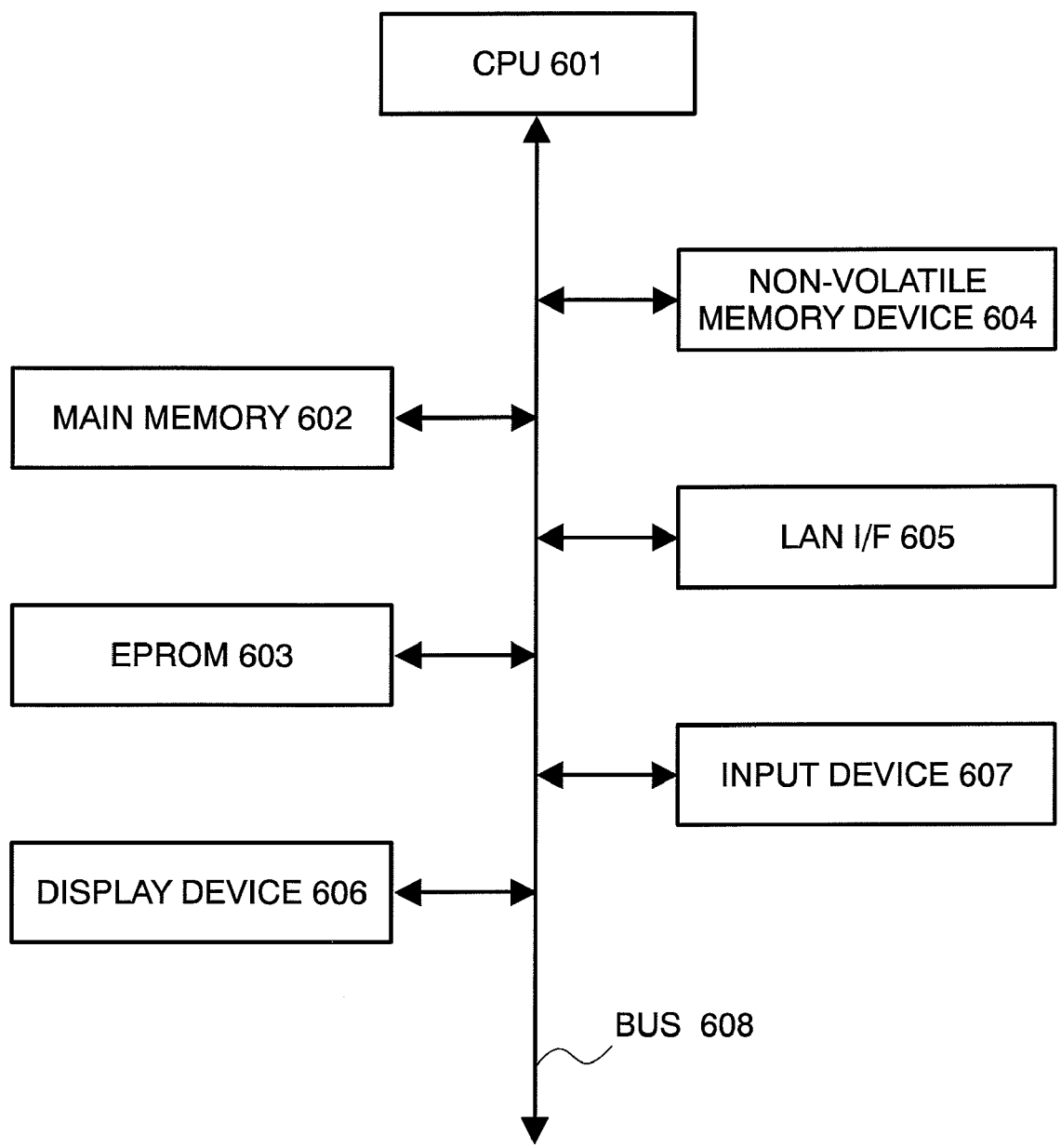
FIG. 3 is an example for showing hardware structures of the home gateway.

FIG. 1 shows an example of network construction of a home network system, into which a home gateway can be applied, according to an embodiment of the present invention. Also, FIG. 3 shows an example of the hardware structures of a home server within the network construction shown in FIG. 1.

In FIG. 1, a reference numeral 10 depicts an application download server, 40 a public communication network or a communication network for exclusive use, using a wire or radio waves, 50 a rooter, 60 a home gateway, 70 an equipment to be controlled, which the home gateway controls, and 100 a home network with using a wire or radio waves.

The home gateway 60 is connected with the communication network 40 through the home network 80 and the rooter 50. Also, to the communication network 40 is connected the application download server 10. And, to the home network 80 are connected the equipments 70, 71 and 72.

The application download server 10 is built up with a general PC server, and it is able to download an application into the home server responding to a request from the home gateway 60.

The home gateway 60 communicates with the application download server 10 through the communication network 40, thereby to download an application enabling to control the equipments 70 to be controlled from the application download serve, and therefore it can communicate and/or control the equipment 70 to be controlled by executing the application.

The equipment 70 to be controlled is an equipment, which is connected with the home network 80 through the radio wave or the wires, and it can send/receive (i.e., communicate) information between the application(s) on the home gateway 60. According to the present embodiment, it is assumed that the equipment 70 to be controlled is the equipment, which is connected with an IP communication network at home through the wires or the radio wave; however, as far as it can communicate the information between the home gateway 60, it may be an equipment that uses the communication network other than the IP, such as, Specification small electricity radio communication network, a serial communication network, and an IEEE 1394 communication network, etc., for example.

FIG. 3 attached herewith is a hardware structure view of the home gateway 60, which the present embodiment can be applied therein.

The home gateway 60 comprises a CPU 601, a main memory 602, a EPROM 603, a non-volatile memory device 604, a LAN I/F 605, a display device 606, and an input device 607. And, each of those constituent elements is connected with a bus 608, so that necessary information can be communicated among those elements. But, not shown in the figure, in case when connecting the equipments 70 to be controlled with the Specification small electricity radio communication network, the serial communication network, and the IEEE 1394 communication network, etc., it is necessary to add an apparatus or device corresponding to it.

Within the EPROM 603 is stored a boot program. Into the non-volatile memory device 604 is stored various kinds of programs. And, when the gateway 60 starts, then the CPU 601 starts up responding to this boot program. The CPU 601 loads the various kinds of programs mentioned above from the non-volatile memory device 604 into the main memory 602. The CPU 601 conducts transmission of signals to the LAN I/F 605, the display device 606, and the input device 607, by executing the various kinds of programs, which are loaded into the main memory 60, and thereby conducting the transmission of information between the application download server 10 and/or the equipment 70 to be controlled.

The non-volatile memory device 604 stores the various kinds of programs and information, which the CPU 601 loads them on the main memory 602 to execute, and it may be achieved by a flash memory or a hard disk, etc.

The LAN I/F 605 is connected with the home network 80, so that it can communicate the information with the various kinds of devices connected with the home network or the communication network 40, and it may be achieved by a network card, etc.

The input device 607, accepting an input from a user, may be achieved with a keyboard, a mouse, an infrared remote controller, etc.

The display device 606 communicates necessary information for connecting with a CRT tube television or a PC monitor, to make drawing on a screen thereof, and it may be achieved with a VGA card, or a video output terminal, etc.

Among the elements shown in FIG. 3, an unnecessary one(s) can be omitted from those. For example, in case when not needing an output to the monitor and an input from the keyboard, but being connected with the home gateway 60, from the Web browser, etc., via the network, it is possible omit the input device 607 and the display device 606 from the construction thereof.

Figures 4, 5:
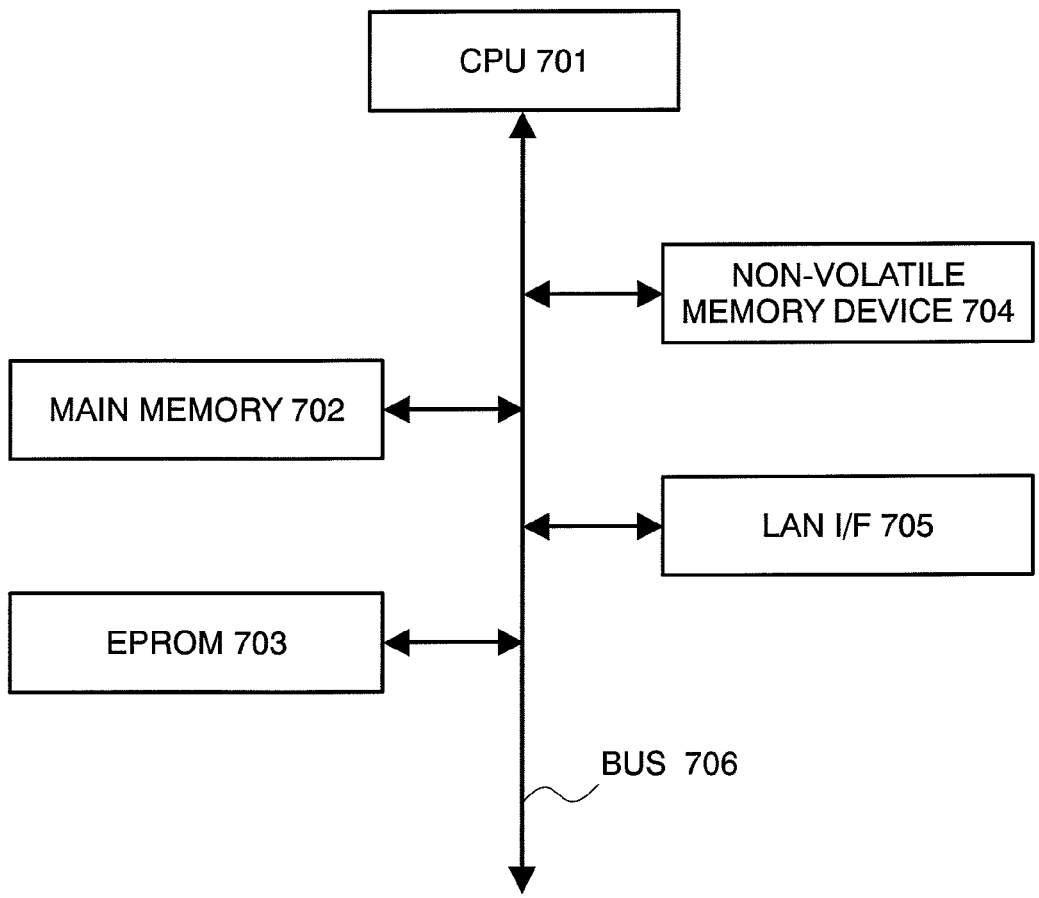
FIG. 4 is an example for showing hardware structures of an apparatus to be controlled.
FIG. 5 is an example for showing a memory information table for use by a service undertaker.

FIG. 4 is a view for showing the hardware construction of the equipment 70 to be controlled, into which the present embodiment can be applied.

The equipment 70 to be controlled comprises a CPU 701, an EPROM 703, a non-volatile memory device 704, and a LAN I/F 705. And, each of those constituent elements is connected with through a bus 706, so that each can communicate necessary information between them in the structures thereof. Although not shown in the figure, in case when connecting the above-mentioned equipment 70 to be controlled through the Specification small electricity radio communication network, the serial communication network, and the IEEE 1394 communication network, etc., it is necessary to add an apparatus or device corresponding to it.

Within the EPROM 703 is stored a boot program. In the non-volatile memory device 704 are stored various kinds of programs. And, when the equipment 70 to be controlled starts, then the CPU 701 operates responding to this boot program. The CPU 701 loads the various kinds of programs, from the non-volatile memory device 704 into the main memory 702, with an aid of the boot program. The CPU 701 conducts transmission of signals to the LAN I/F 705 by executing the various kinds of programs loaded onto the main memory 702, so that it makes communication of the information with the home gateway 60.

The non-volatile memory device 704 stores the various kinds of programs and information, which the CPU 701 loads them on the main memory 702 to execute, and it may be achieved by a flash memory or a hard disk, etc.

The LAN I/F 705 is connected with the home network 80, so that it communicate information with the home gateway 60, and it may be achieved with a network card, etc.

Among the elements shown in FIG. 4, an unnecessary one(s) can be omitted from the construction.

Next, explanation will be made on operations of the present embodiment.

Figure 8:
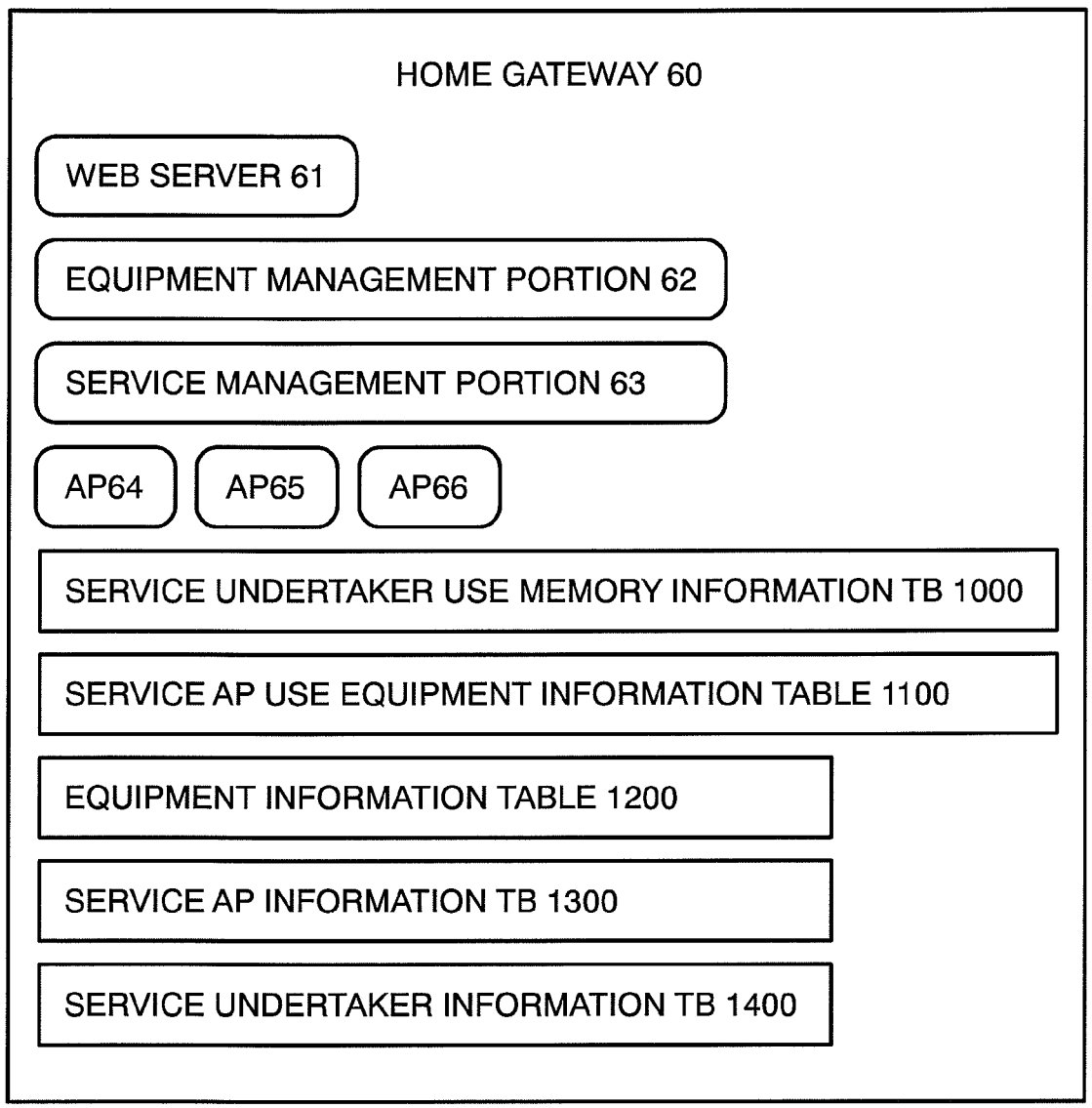
FIG. 8 is an example for showing software of home gateway and the table structures thereof.

FIG. 8 is the structure view of software and a table of the home gateway 60. The home gateway 60 is built up with software and tables, such as, a Web server 61, an equipment management portion 62, a service management portion 63, an application 64, an application 65, an application 66, a service undertaker use memory information table 1000, a service AP use equipment information table 1100, an equipment information table 1200, a service AP information table 1300, a service undertaker information table 1400, etc., for example.

The Web server functions as a user I/F, so that the user can communicate information with the home gateway 60, through making a connection from the browser installed into a PC or a digital television not shown in FIG. 1, which the user owns. Also, it is possible to execute a service application for making a downloading from the application download server 10 (hereinafter, being called "service AP").

The equipment management portion 62 manages information of the equipment 70 to be controlled, which is connected with the home network 80, with using the equipment information table 1200. It also provides home-equipment information, which is described on the equipment information table 1200, to the service AP, or it manages connection to the home-equipment, with using the service AP use equipment information table 1100.

The service management portion 63 starts the service AP with using the service undertaker use memory information table 1000.

The applications 64, 65 and 66 are examples of the service APs, which are downloaded from the application download server 10.

The home gateway 60 manages the information relating to the equipment 70 to be controlled, which is connected with the home network 80, with using the equipment information table 1200, as shown in FIG. 7.

FIG. 5 shows the service undertaker use memory information table 1000. This service undertaker use memory information table 1000 is made up with a service undertaker ID 1001 and a use memory volume 1002. Information of those are obtained at the time when downloading the service AP, together with that service AP.

FIG. 6 shows the service AP use equipment information table 1100. This service AP use equipment information table 1100 is made up with a service AP ID 1101 and a use equipment ID 1102. Information of those are set up when downloading the service AP, etc., for example, by a user.

FIG. 7 shows the equipment information table 1200. This equipment information table 1200 is made up with an equipment ID 1201, an equipment name 1202, and an IP address 1203. Information of those are obtained in advance through communication between the home gateway 60 and the equipment 70 to be controlled, or through setting up, which is made by the user to the home gateway 60.

FIG. 9 shows the service AP information table 1300. This service AP information table 1300 is made up with a service AP ID 1301 and a service AP name 1302. Information of those are obtained when downloading the service AP from the application download server 10.

FIG. 10 shows the service undertaker information table 1400. This service undertaker information table 1400 is made up with a service AP IF 1401 and a service undertaker ID 1402.

The service AP is started upon the fact that the user transmits an instruction for a program (CGI), which is operable on the Web server 61.

Figure 11:
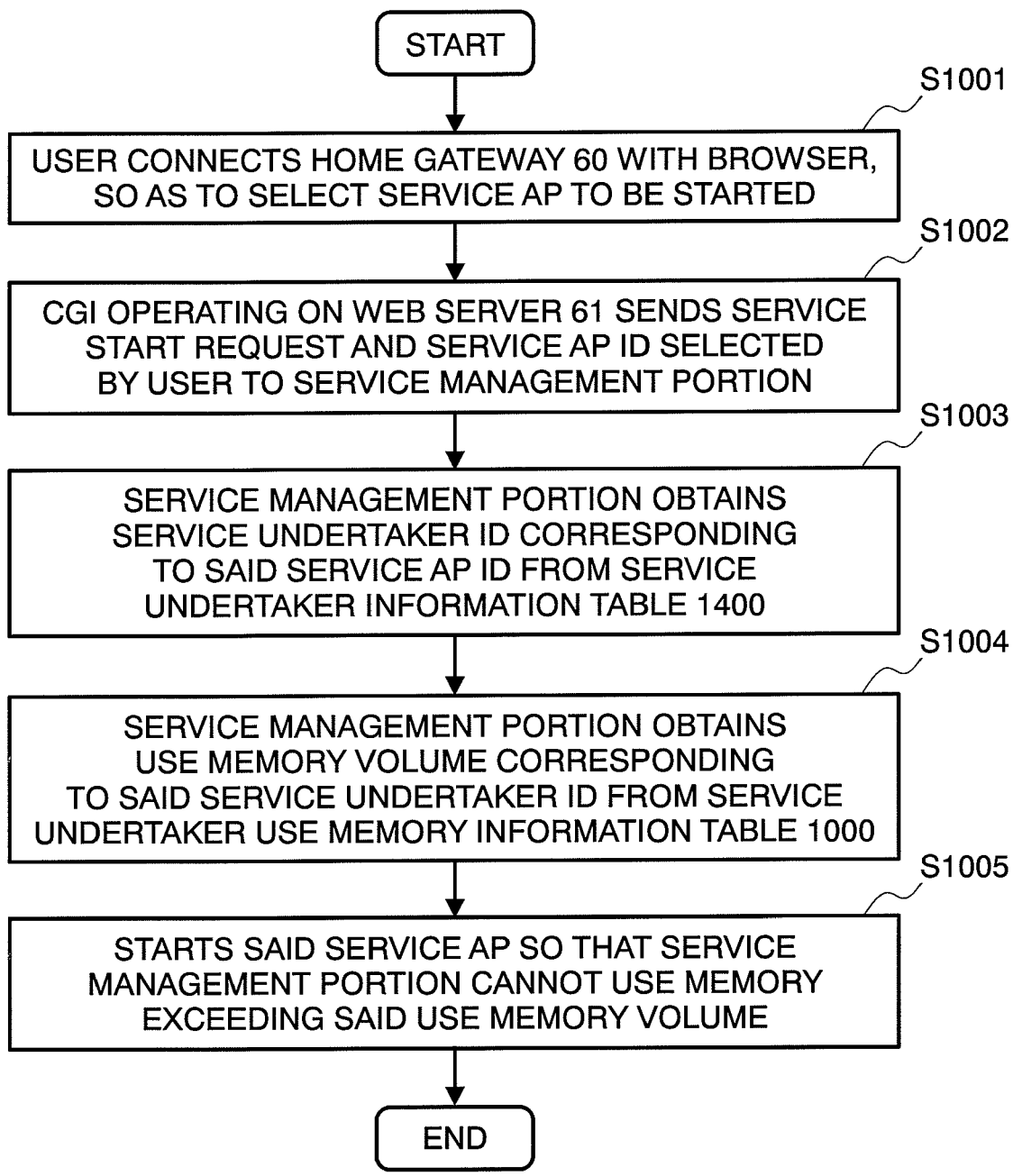
FIG. 11 is an example of a flowchart for starting a service AP.

FIG. 11 shows a flowchart from when the user transmits the instruction up to when the service AP is started.

First of all, the user connects with the Web server through the browser, so as to select the service AP to be started (S1001), and next, the CGI operable on the Web server 61 transmits a service start request and the service AP ID, which the user selects, to the service management portion 63 (S1002). Next, the service management portion 63 obtains the service undertaker ID corresponding to that service AP ID, from the service undertaker information table 1400 (S1003), and next the service management portion 63 obtains the use memory volume corresponding to that service undertaker ID, from the service undertaker user memory information table 1000 (S1004). Next, the service management portion 63 starts that service AP, so that the memory does not exceeds that use memory volume (S1005).

The steps of S1005 are achieved, as follows.

First of all, explanation will be made on the case when the service AP is Java (registered trade mark).

The Java (registered trade mark) is able to designate a maximum heap region, when starting a Java (a registered trade mark) VM. Then, by designating the use memory volume to be such the maximum heap region, it is possible to designate so that the service AP does not use the memory exceeding that use memory volume. For example, in case where the use memory volume of "AP64.class" is 10 MB, a Java (the registered trademark) command is "Java (registered trade mark) –Xmx10m AP64".

Next, explanation will be given about the case where the service AP is not the Java (registered trade mark), but is a native program.

First of all, the service AP is executed with a normal procedure. Next, by means of the system call, a process number of that service AP is obtained. Next, a memory volume consumed by the service AP of that process number is obtained through the system call, and it is observed. In case when the consumed memory volume exceeds the use memory volume of the service, it is possible to start up the service AP so that it cannot use the memory exceeding the use memory volume, by compulsively ending the process of that process number.

Starting the service AP in accordance with the steps mentioned above enables to executed the service APs of plural number of service undertakers, so that the service AP of a certain service undertaker does not give an ill influence upon the service APs of other service undertakers.

Figure 12:
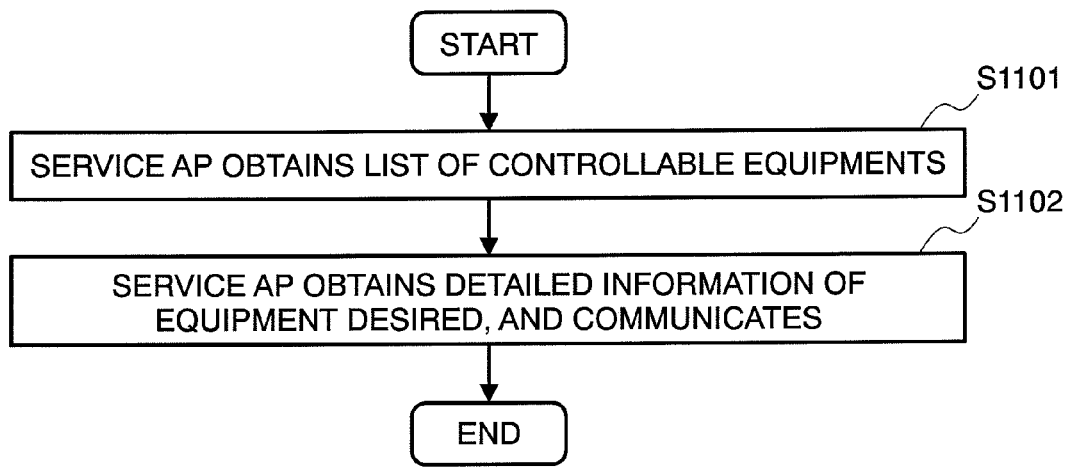
FIG. 12 shows an example of a flowchart for controlling equipment at home.

FIG. 12 is a flowchart for showing steps for the service AP to control the equipment 70 to be controlled.

First of all, a list is obtained about the equipments, which the service AP can control (S1101). Next, the service AP obtains the detailed information of the equipment at desire, so as to make communication (S1102).

Figure 13:
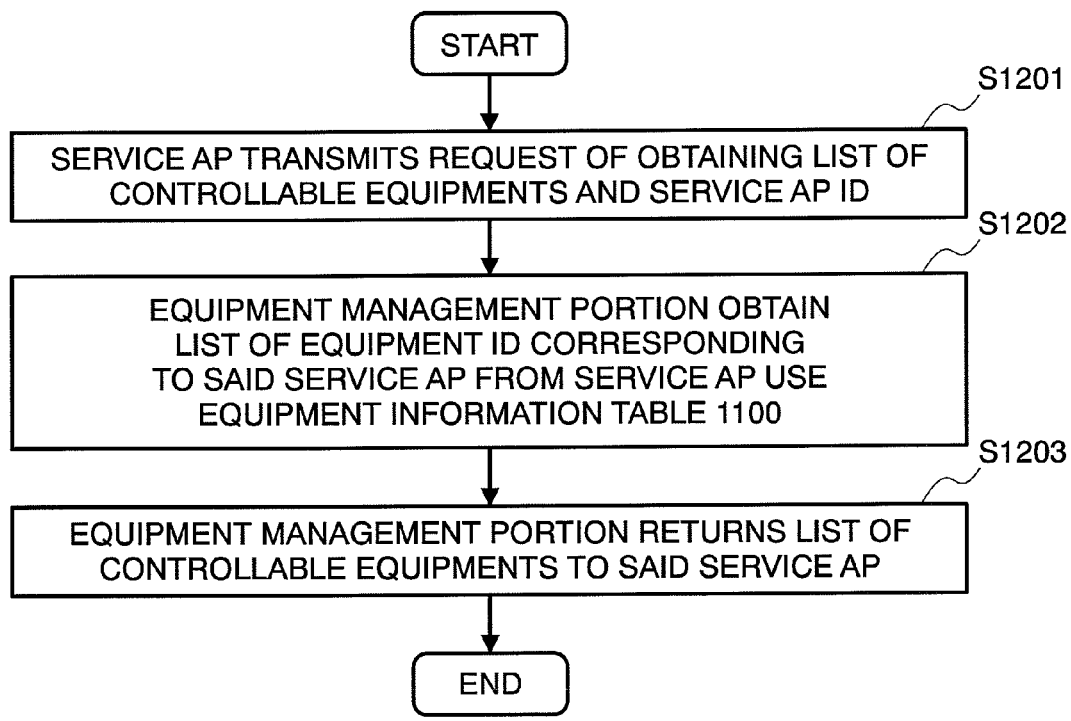
FIG. 13 shows an example of a flowchart of processing for obtaining a list of equipment informing for controlling the equipments at home.

The details of steps in S1101 will be shown in FIG. 13 attached herewith.

First of all, the service AP transmits a request for obtaining the list of controllable equipments and the service AP ID, to the equipment management portion (S1201). Next, the equipment management port obtains the list of the use equipment IDs corresponding to that service AP, from the service AP use equipment information table 1100 (S1202). Next, the equipment management portion returns the list of controllable equipments back to that service AP (S1203).

Figure 14:
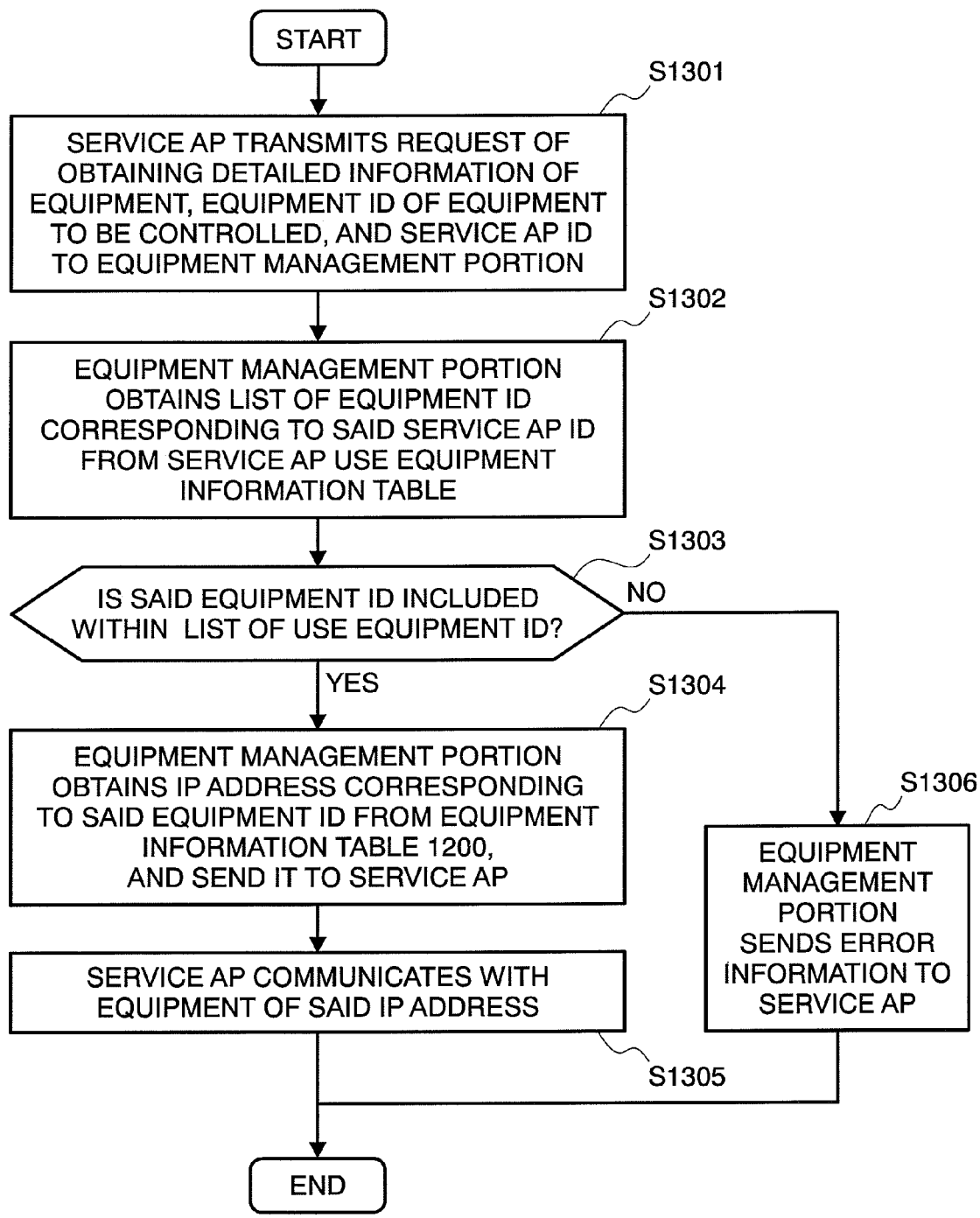
FIG. 14 shows an example of a flowchart for obtaining detailed informing of controlling the equipments at home and for controlling the equipment.

Also, the details of steps in S1102 will be shown in FIG. 14 attached herewith.

First of all, the service AP transmits a request for obtaining the detailed information of equipments, the equipment IDs of the equipments to be controlled and the service AP ID, to the equipment management portion (S1301). Next, the equipment management portion obtain a list of the use equipment IDs corresponding to that service AP ID from the service AP use equipment information table (S1302) Next, determination is made on whether that equipment ID is included or not within the list of use equipment ID (S1303), and if it is included, the equipment management portion obtains the IP address corresponding to that equipment ID, so as to send it to the service AP (S1304), and the service AP makes connection with the equipment of that IP address, to make communication therewith (S1305). In case when that equipment ID is not included within the list of use equipment IDs, in the step of S1303, the equipment management portion transmits error information to the service AP (S1306)

Controlling the equipment 70 to be controlled, which the service AP connects to the home network 80 in the manner mentioned above, it is possible for the service AP to make control only upon the predetermined equipment(s) to be controlled.

As was mentioned above, according to the present embodiment, with controlling the volume of memory, which the service application operating on the home gateway uses within a home where the service applications of plural number of service undertakes are mixed with, the plural number of the service undertakers are operable without obstructing with each other. Also, by making the service applications unable to connect with others than the equipments within the home, which are determined in advance, it is possible to achieve smooth facilities of services within a home network system where the service applications of the plural number of service undertakes are mixed with.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A gateway apparatus, being connected with a home network and a network, comprising:
   a control unit controls equipments, which are connected with said home network;
   a download unit downloads an application from said network; and
   a memory stores information that indicates correspondence relation between an equipment and the application authorized to access the equipment,
   said control unit performs such control that the application downloaded by said download unit controls at least one of said equipments on the basis of said information.

2. The gateway apparatus, as described in the claim 1, wherein said information relating to equipments, for which said application is applicable is the information, which is obtained through said home network.

3. The gateway apparatus, as described in the claim 1, wherein said control unit controls said equipment upon basis of information relating to use memory for said application.

4. The gateway apparatus, as described in the claim 1, wherein the information relating to the use memory for said application is obtained when said download unit downloads said application.

5. The gateway apparatus, as described in the claim 1, wherein said control unit has a predetermined memory volume, and controls said equipment so that the use memory volume for said application does not exceed said predetermined memory volume.

6. The gateway apparatus, as described in the claim 5, wherein said control unit controls said equipment so that it can execute said application when the user memory volume is equal to or less than said predetermined memory volume, while controls so as to restrict execution of said application when the user memory volume is greater than said predetermined memory volume.

7. A system, comprising:
   a server for distributing application through a network;
   a gateway apparatus, being connected with said network and a home network; and
   equipments, being connected with said home network,
   wherein said gateway apparatus comprises:
   a control unit controls equipments connected with said home network;
   a download unit downloads an application from said network; and
   a memory stores information that indicates correspondence relation between an equipment and the application authorized to access the equipment,
   wherein said control unit performs such control that the application downloaded by said download unit controls at least one of said equipments on the basis of said information.

8. The system, as described in the claim 7, wherein said control means, within said gateway, controls said equipments upon basis of information relating to use memory for said application.

9. The system, as described in the claim 8, wherein said control unit has a predetermined memory volume, and controls said equipment so that the use memory volume for said application does not exceed said predetermined memory volume.

* * * * *